United States Patent
Prasad (10) Patent No.: US 8,645,437 B2
(45) Date of Patent: Feb. 4, 2014

(54) SYSTEM AND METHOD FOR PROVIDING FAST STARTUP OF A LARGE FILE DELIVERY

(75) Inventor: Vishwa Prasad, Matawan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 281 days.

(21) Appl. No.: 12/915,645

(22) Filed: Oct. 29, 2010

(65) Prior Publication Data

US 2012/0110040 A1    May 3, 2012

(51) Int. Cl.
*G06F 17/30* (2006.01)
(52) U.S. Cl.
USPC .......................................................... 707/823
(58) Field of Classification Search
USPC .............................................. 707/823, 999.01
See application file for complete search history.

(56) References Cited

U.S. PATENT DOCUMENTS

| | | | | |
|---|---|---|---|---|
| 8,510,524 | B1 * | 8/2013 | Corbett et al. ................. | 711/162 |
| 2001/0018728 | A1 * | 8/2001 | Topham et al. ............... | 711/113 |
| 2002/0161911 | A1 * | 10/2002 | Pinckney et al. ............. | 709/231 |
| 2003/0026254 | A1 * | 2/2003 | Sim ................................ | 370/392 |
| 2003/0033325 | A1 * | 2/2003 | Boogaard .................. | 707/999.2 |
| 2005/0044250 | A1 * | 2/2005 | Gay et al. ....................... | 709/230 |
| 2005/0185496 | A1 | 8/2005 | Kaler | |
| 2006/0072596 | A1 * | 4/2006 | Spilo et al. ..................... | 370/412 |
| 2006/0230176 | A1 * | 10/2006 | Dacosta ......................... | 709/235 |
| 2008/0052319 | A1 * | 2/2008 | Dunning et al. ........ | 707/999.107 |
| 2008/0310814 | A1 * | 12/2008 | Bowra et al. .................. | 386/241 |
| 2009/0210547 | A1 * | 8/2009 | Lassen et al. ................. | 709/230 |
| 2010/0131671 | A1 * | 5/2010 | Kohli et al. .................... | 709/233 |
| 2010/0161766 | A1 | 6/2010 | Shiobara et al. | |
| 2010/0281230 | A1 * | 11/2010 | Rabii et al. .................... | 711/165 |

* cited by examiner

*Primary Examiner* — Cam-Linh Nguyen
(74) *Attorney, Agent, or Firm* — Akerman LLP; Michael K. Dixon; Roy P. Zachariah (57) ABSTRACT

A file delivery system includes a disk file system, a solid state drive file system, and an interface module. The disk file system includes a disk drive that stores a plurality of files for download by a user device. The solid state drive file system includes a solid state drive that stores a first block of data for each of the files stored on the disk drive. The interface module is in communication with the disk file system and with the solid state drive file system, and is configured to retrieve the first block of data of one of the files from the solid state drive in response to a request from the user device for one of the files, to send a read command to the disk drive for a next block of the one of the files at substantially the same time as the first block is retrieved from the solid state drive and sent to the user device, and to store the next block in a buffer.

20 Claims, 5 Drawing Sheets

SYSTEM AND METHOD FOR PROVIDING FAST STARTUP OF A LARGE FILE DELIVERY

FIELD OF THE DISCLOSURE

This disclosure generally relates to communications networks, and more particularly relates to a system and method for providing fast startup of a large file delivery.

BACKGROUND

A file delivery system can provide large files, such as video-on-demand (VOD) files, software files, portable document format files, word document files, and other application files, for download. The large files can be stored within a disk file system that is designed to store the files in large block sizes. A user device can connect to the file delivery system to download the files stored in the file delivery system. The files can be delivered from the file delivery system to the user device in chunks or blocks having specific data sizes.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
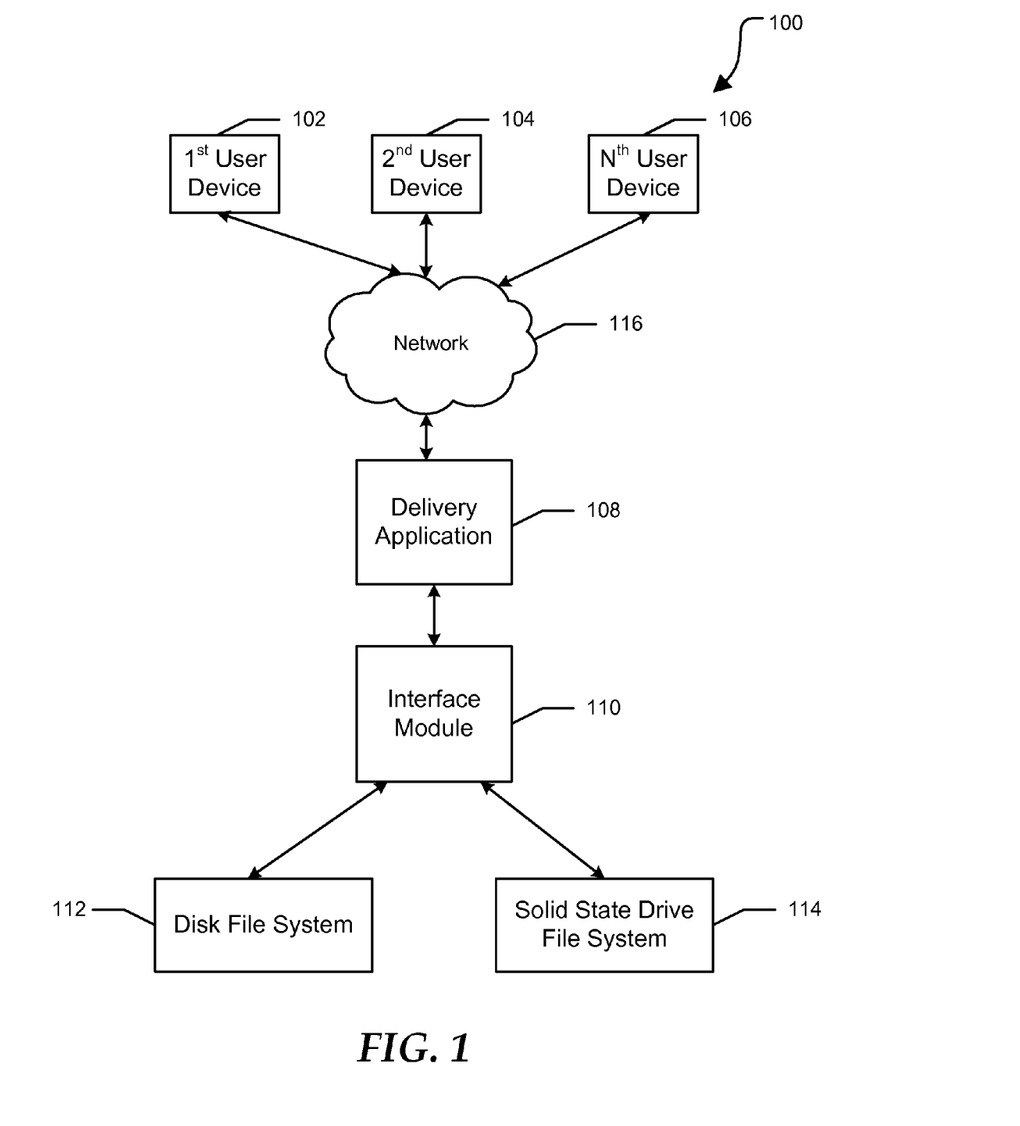
FIG. 1 is a block diagram of a file delivery system.

FIG. 1 shows a file delivery system 100 including user devices 102, 104, and 106, a delivery application 108, an interface module 110, a disk file system 112, and a solid state drive (SSD) file system 114. Each of the user devices 102, 104, and 106 are in communication with the delivery application 108 via a network 116. The network 116 can be any wired, wireless, or combination wired and wireless network capable of providing data to and receiving data from the user devices 102, 104, and 106. The delivery application 108 is in communication with the interface module 110, which in turn is in communication with the disk file system 112 and with the SSD file system 114.

The file delivery system 100 can store different files for download by the user devices 102, 104, and 106. The files available for downloading may be files that are large or small in size, such as video-on demand (VOD) files, software files, word processing files, portable document format files, and other files. The disk file system 112 can include a number of disk drives, such as serial advanced technology attachment (SATA) drives, advanced technology attachment (ATA) drives, small computer system interface (SCSI) drives, serial attached SCSI (SAS) drives, or the like, to store the entire portion of each of the files available from the file delivery system 100. The SSD file system 114 can include a number of solid state drives. The disk drives of the disk file system 112 can have significantly more storage space than the solid state drives of the SSD file system 114. However, a read time for a file from the disk drives can be substantially slower than a read time from the solid state drives.

During an initial setup of the file delivery system 100, a first block or few blocks of each file available from the file delivery system can be written to both the disk file system 112 and to the SSD file system 114. The delivery application 108 and/or an administrator of the file delivery system 100 can optimize a startup time for delivering the file to a user by specifying the size of the block and the number of the first few blocks of the file stored in the SSD file system 114 based on size of the file stored in the disk file system 112 and the bandwidth of the network 116. The delivery application 108 and/or the administrator of the file delivery system 100 can also maximize the transfer rate of the network 116 by specifying the amount of data that can be cached in a buffer of the interface module 110 based on the bandwidth of the network 116. The delivery application 108 and/or the administrator of the file delivery system 100 can also set a number of parameters for the interface module 110 to make the size of the block and the number of the first few blocks of the file stored in the SSD file system 114 static for all files, or dynamic so that the interface module can manage the SSD file system and the cache buffer of the interface module on a file by file basis.

If the file stored in the disk file system 112 is a large file and the administrator has set the number of blocks stored in the SSD file system 114 to one, the first block of the file stored in the SSD file system can be two Megabytes (MB) of data, four MB of data, or the like as specified by the administrator. A startup time for delivering the file to a user can be optimized, and the transfer rate of the network 116 can be maximized with a large enough block size set by the administrator and only storing a first block in the SSD file system 114. The first block of the file can be written under a same file name to both the disk file system 112 and to the SSD file system 114 so that the interface module 110 can write the first block of the file to both the disk file system and the SSD file system. The remaining portion of the file is then stored on the disk file system 112.

An individual file stored in the disk file system 112 can be stored entirely in a single disk drive of the disk file system, can be broken into multiple chunks or blocks of data and stored in one or more disk drives, or the like. The interface module 110 can utilize logic to identify the first block or chunk of the file as compared to when the file is stored entirely on a single disk drive. The logic can include identifiers for each of the blocks of the file to identify the placement of the blocks within the file.

One of the user devices 102, 104, or 106 can send a read request for a file to the delivery application 108 via the network 116. The delivery application 108 can then send a request for a first block of the file to the interface module 110, which in turn can retrieve the first block from the SSD file system 114 and send the first block to the requesting user device 102, 104, or 106. The interface module 110 can also send a read command for a second block of the file to the disk file system 112 at substantially the same time as the first block is delivered to the user device 102, 104, or 106. The interface module 110 can then store the second block of the file within a cache buffer of the interface module so that the second block can be ready to send to the user device 102, 104, or 106 if a read request for the second block is received.

When the user device 102, 104, or 106 sends a read request for the second block of the file via the network 116 and the delivery application 108, the interface module 110 can send the second block to the user device from the cache buffer and send a read command for a third block of the file to the disk file system 112 at substantially the same time. Thus, the interface module 110 can continually have a block of the file cached in the buffer and ready to deliver to the user device 102, 104, or 106 so that the entire file can be delivered to the user device at a highest possible speed without a pause to retrieve the next block. If the file is deleted from the disk file system 112 or from the SSD file system 114, then the file is also deleted from the other file system. Additionally, if the user device 102, 104, or 106 closes a communication link with the delivery application 108 and the interface module 110 before the entire requested file is downloaded, then the interface module can discard the block of the file stored in the buffer and wait for a next read request.

For example, the file requested by the user device 102, 104, or 106 can be an audio/video advertisement that is displayed on a web page being accessed by the user device. The user device 102, 104, or 106 may close the advertisement before the entire file for the advertisement has been downloaded to the user device, such that a block of the file may be cached in the buffer of the interface module 110. When the user device 102, 104, or 106 closes the advertisement before the advertisement has been completed, the interface module 110 can discard the block of the file cached in the buffer and wait for the next read request.

In an exemplary embodiment, the file delivery system 100 can provide VOD files to the user devices 102, 104, and 106. An average file size can be one Gigabyte (GB), which can be approximately equal to the size of a ninety minute standard definition VOD movie. The disk file system 112 can include ten disk drives that can each store one Terabyte (TB) of data, such that the disk file system can to store ten Terabytes of data. Therefore, the file delivery system 100 can store up to ten thousand VOD files, based on the size of an average VOD file in the file delivery system and the storage space of the disk file system 112. The administrator of the file delivery system 100 can utilize the delivery application 108 to set the size of a single block of a file to two MB. The SSD file system 114 may have twenty GB of storage space so that the two MB first block of each of the ten thousand VOD files can be stored on the SSD file system. As the density of SSD increases the storage capacity of the SSD file system 114 also increases.

During any given point in time, there may be around five thousand user devices simultaneously requesting a file from the file delivery system 100, such that the file delivery system can provide access to five thousand files at substantially the same time. The interface module 110 may have ten GB of memory for buffering the blocks of the VOD files before sending the blocks to the user devices based on a possible five thousand files with a two MB block size being accessed at substantially the same time.

During an exemplary read operation, an average time to read the two MB first block can be between twenty-nine and one hundred milliseconds (ms) for the disk file system 112, and about eight ms for the SSD file system 114. Thus, the file delivery system 100 can have a substantially faster read time for the first block of the file by reading the first block from the SSD file system 114 instead of from the disk file system 112.

In another exemplary read operation, the delivery application 108 can request smaller portions, such as four Kilobytes, of the first block at a time for delivery from the SSD file system 114, based on the SSD file system 114 having a very high input/output per second rate. In this situation, the average read time for these smaller portions can be below milliseconds, such as around two hundred microseconds.

Figure 2:
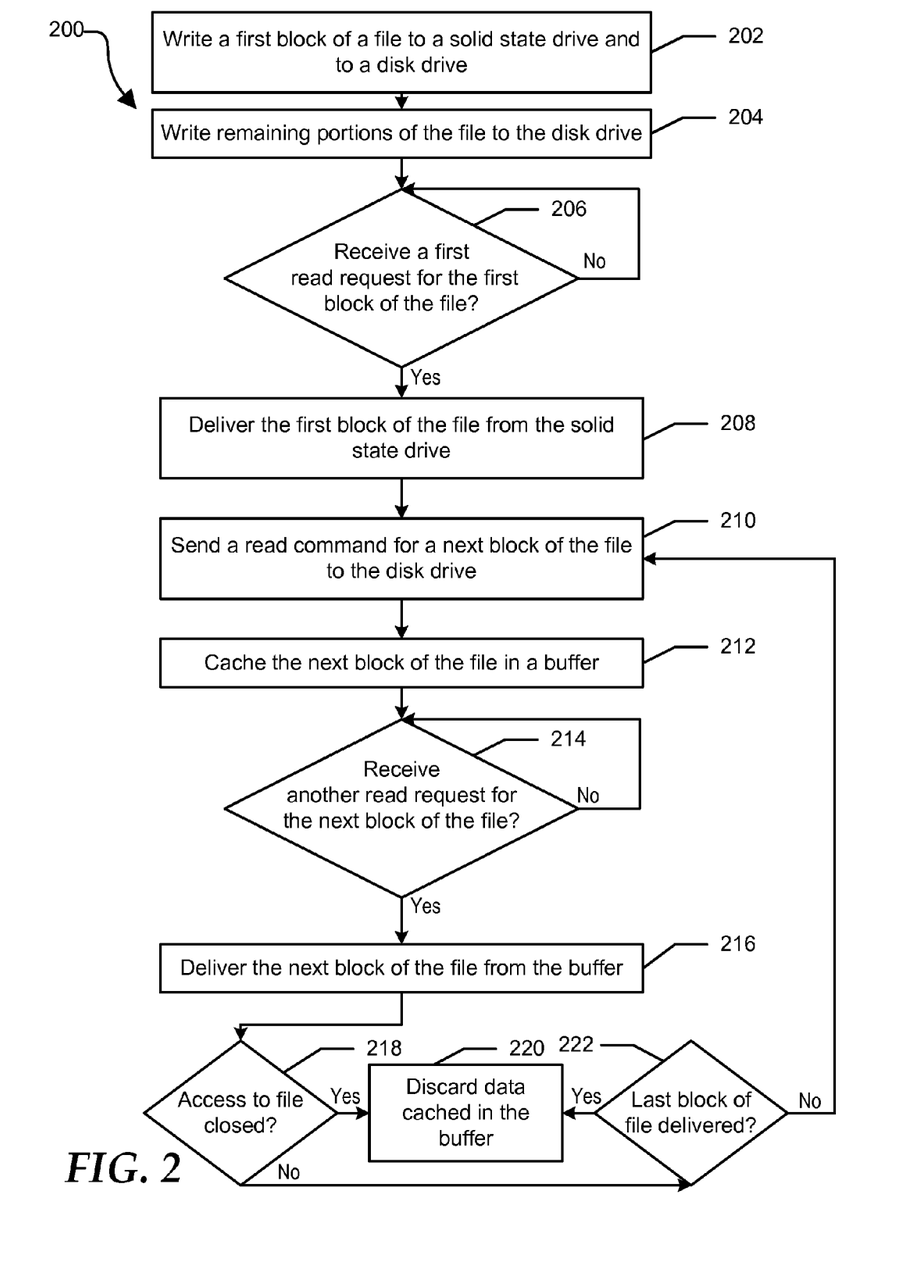
FIG. 2 is a flow diagram of a method for providing fast startup of a large file delivery in the file delivery system.

FIG. 2 shows a method 200 for providing fast startup of a large file delivery. At block 202, a first block of a file is written to a solid state drive and to a disk drive. The size of the first block can be specified by an administrator of the system, such as two MB, four MB, or the like. The first block can be written to the solid state drive under the same file name as to the disk drive. The remaining portions of the file are written to the disk drive at block 204. At block 206, a determination is made whether a first read request for the first block of the file has been received. When the first read request is received, the first block of the file is delivered from the solid state drive to at block 208.

At block 210, a read command for a next block of the file is sent to the disk drive. The read command can be sent at substantially the same time as when the first block is delivered from the solid state drive. The next block of the file is cached in a buffer at block 212. At block 214, a determination is made whether another read request is received for the next block of the file. When another read request is received, the next block of the file is delivered from the buffer at block 216. At block 218, a determination is made whether access to the file has been closed.

If access to the file has been closed, then data cached in the buffer is discarded at block 220. However, if access to the file has not been closed, a determination is made whether a last block of the file has been delivered at block 222. If the last block of the file has been delivered, then the data cached in the buffer is discarded at block 220. If the last block of the file has not been delivered, then the flow diagram repeats as stated above at block 210.

Figure 3:
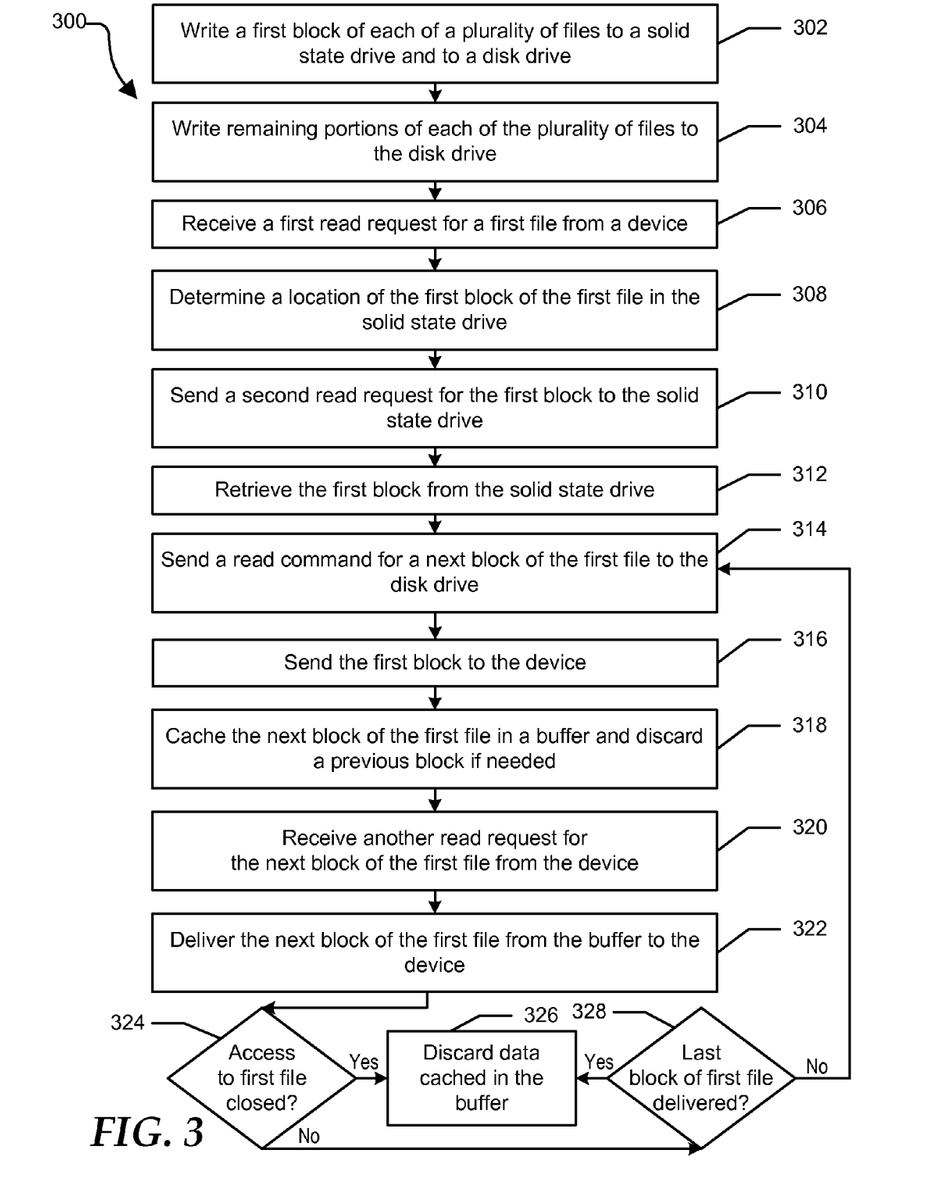
FIG. 3 is a flow diagram of another method for providing fast startup of a large file delivery in the file delivery system.

FIG. 3 shows another method 300 for providing fast startup of a large file delivery. At block 302, a first block of each of a plurality of files is written to a solid state drive and to a disk drive. The size of the first block can be specified by an administrator of the system, such as two MB, four MB, or the like. The first block of one of the files can be written to the solid state drive under the same file name as the first block is written to the disk drive. The remaining portions of the plurality of files are written to the disk drive at block 304. At block 306, a first read request for a first file of the plurality of files is received from a user device.

At block 308, a location of the first block of the first file in the solid state drive is determined. A second read request for the first block is sent to the solid state drive at block 310. At block 312, the first block is retrieved from the solid state drive. A read command for the next block of the first file is sent to the disk drive at block 314. The read command can be sent at substantially the same time as when the first block is delivered from the solid state drive. At block 316, the first block is sent to the user device. The next block of the first file is cached in a buffer and a previous block is discarded from the buffer if needed at block 318. The previous block can be discarded if space is needed in the buffer to store the next block of the first file. At block 320, another read request for the next block of the first file is received from the user device. The next block of the first file is delivered from the buffer to the user device at block 322.

At block 324, a determination is made whether access to the first file has been closed. If access to the first file has been closed, then data cached in the buffer is discarded at block 326. However, if access to the first file has not been closed, then a determination is made whether a last block of the first file has been delivered at block 328. If the last block of the first file has been delivered then the data cached in the buffer is discarded at block 326. If the last block of the first file has not been delivered, then the flow diagram repeats as stated above at block 314.

Figure 4:
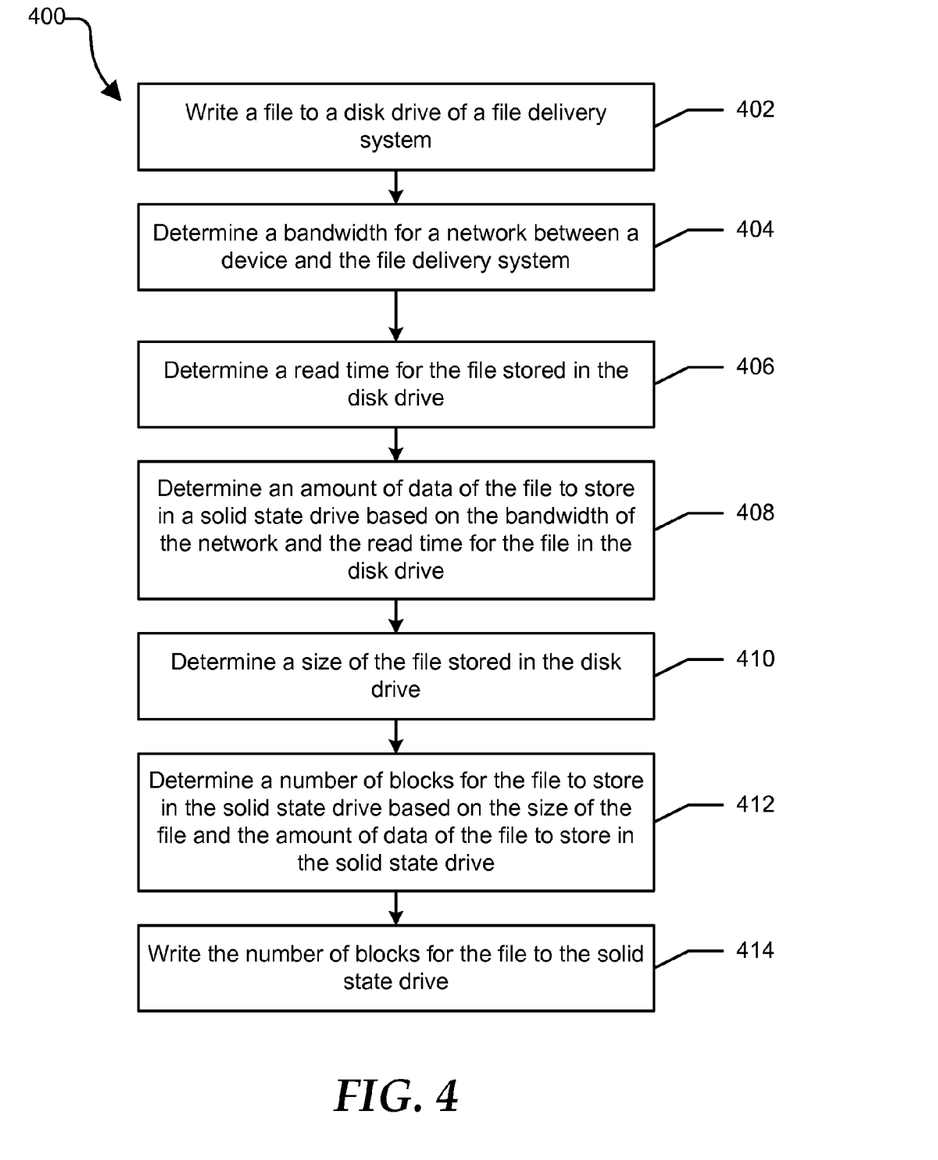
FIG. 4 is a flow diagram of a method for setting a size of a first block in the file delivery system.

FIG. 4 shows a method 400 for dynamically setting a size of a first block of a file in a file delivery system. At block 402, a file is written to a disk drive of a file delivery system. A bandwidth for a network between a device and the file delivery system is determined at block 404. A read time for the file stored in the disk drive is determined at block 406. At block 408, an amount of data of the file to store in a solid state drive is determined based on the network bandwidth and the read time for the file in the disk drive. The amount of data stored in the solid state drive for a file can increase for higher bandwidths of the network, and for slower read times in the disk drive. Alternatively, the amount of data stored in the solid state drive for a file can decrease for lower bandwidths of the network, and for faster read times in the disk drive.

At block 410, a size of the file stored in the disk drive is determined. A number of blocks for the file to store in the solid state drive is determined based on the size of the file and the amount of data of the file to store in the solid state drive at block 412. A larger file stored in the disk drive can have fewer large blocks stored in the solid state drive than a smaller file in the disk drive with smaller blocks. At block 414, the number of blocks for the file is written to the solid state drive.

Figure 5:
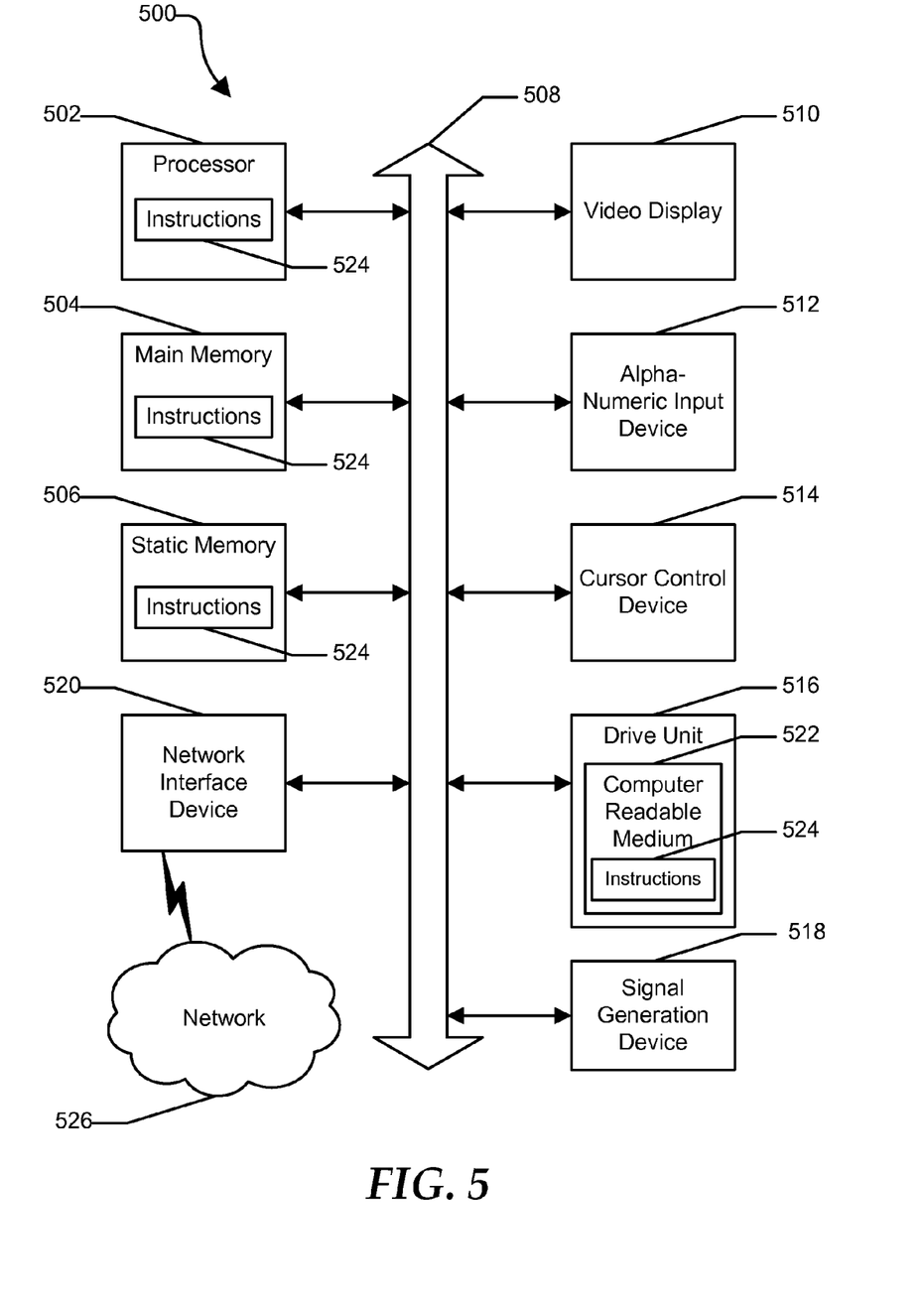
FIG. 5 is a block diagram of a general computer system.

FIG. 5 shows an illustrative embodiment of a general computer system 500 in accordance with at least one embodiment of the present disclosure. The computer system 500 can include a set of instructions that can be executed to cause the computer system to perform any one or more of the methods or computer based functions disclosed herein. The computer system 500 may operate as a standalone device or may be connected such as using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502 such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524 such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media. The network interface device 520 can provide connectivity to a network 526, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A file delivery system, comprising:
   a disk file system including a disk drive, wherein the disk drive stores a file comprising a plurality of blocks of data, the file including content for streaming by a user device;
   a solid state drive file system including a solid state drive, wherein the solid state stores a first sequential block of data of the blocks of data, but not a remaining portion of the blocks of data; and
   an interface module in communication with the disk file system and with the solid state drive file system, the interface module configured to retrieve the first sequential block of data from the solid state drive in response to a request from the user device for the file, to send a read command to the disk drive for a next sequential block of the file at substantially the same time as the first sequential block is retrieved from the solid state drive and sent to the user device, and to store the next sequential block in a buffer.

2. The file delivery system of claim 1, further comprising:
   a delivery application in communication with the interface module, the delivery application configured to set a size of the first sequential block and the next sequential block, and to submit the request for the file from the user device to the interface module.

3. The file delivery system of claim 1, wherein the interface module is further configured to delete the next sequential block from the buffer when request for the file is closed.

4. The file delivery system of claim 1, wherein the file is a video-on-demand file.

5. The file delivery system of claim 1, wherein a first read time for the solid state drive is substantially shorter than a second read time for the disk drive.

6. The file delivery system of claim 1, wherein the disk drive is a serial advance technology attachment disk drive.

7. A method, comprising:
   writing a first sequential block of a streaming file to a solid state drive and to a disk drive;
   writing remaining blocks of the streaming file to the disk drive;
   receiving a first read request for the first sequential block of the streaming file;
   delivering the first sequential block of the streaming file from the solid state drive in response to receiving the first read request;
   sending a read command for a next sequential block of the streaming file to the disk drive, wherein the read command is sent at substantially the same time as when the first sequential block is delivered from the solid state drive;
   caching the next sequential block of the streaming file in a buffer;
   receiving a second read request for the next sequential block of the streaming file; and
   delivering the next sequential block of the streaming file from the buffer in response to the second read request.

8. The method of claim 7, further comprising:
   determining whether access to the streaming file has been closed;
   discarding the next sequential block from the buffer if access to the streaming file has been closed;
   determining whether a last block of the streaming file has been delivered if access to the streaming file has not been closed; and
   discarding a last sequential block of the streaming file from the buffer when the last sequential block has been delivered if access to the streaming file has not been closed.

9. The method claim 7, wherein a size of the first sequential block is specified by an administrator.

10. The method claim 7, wherein the first sequential block is written to the solid state drive under a same file name as to the disk drive.

11. The method of claim 7, wherein the streaming file is a video-on-demand file.

12. The method of claim 7, wherein a first read time for the solid state drive is substantially shorter than a second read time for the disk drive.

13. The method of claim 7, wherein the disk drive is a serial advance technology attachment disk drive.

14. A non transitory computer readable device comprising instructions, which when loaded and executed by a processor, cause the processor to perform operations comprising:
   writing a first sequential block of a streaming file to a solid state drive and to a disk drive;
   writing remaining blocks of the streaming file to the disk drive;
   receiving a first read request for the first block of the streaming file;
   delivering the first sequential block of the streaming file from the solid state drive in response to receiving the first read request;
   sending a read command for a next sequential block of the streaming file to the disk drive, wherein the read command is sent at substantially the same time as when the first sequential block is delivered from the solid state drive;
   caching the next sequential block of the streaming file in a buffer;
   receiving a second read request for the next sequential block of the streaming file; and
   delivering the next sequential block of the streaming file from the buffer in response to the second read request.

15. The computer readable device of claim 14, the method further comprising:
   determining whether access to the streaming file has been closed;
   discarding the next sequential block from the buffer if access to the streaming file has been closed;

determining whether a last block of the streaming file has been delivered if access to the streaming file has not been closed; and discarding a last sequential block of the streaming file from the buffer when the last sequential block has been delivered if access to the streaming file has not been closed.

16. The computer readable device of claim 14, wherein a size of the first sequential block is specified by an administrator.

17. The computer readable device of claim 14, wherein the first sequential block is written to the solid state drive under a same file name as to the disk drive.

18. The computer readable device of claim 14, wherein the streaming file is a video-on-demand file.

19. The computer readable device of claim 15, wherein a first read time for the solid state drive is substantially shorter than a second read time for the disk drive.

20. The computer readable device of claim 14, wherein the disk drive is a serial advance technology attachment disk drive.

* * * * *